United States Patent [19]

Hino et al.

[11] 4,077,475
[45] Mar. 7, 1978

[54] TRACTOR TYPE VEHICLE INCLUDING ENGINE AND LOAD CONTROL THEREFOR AND PROVIDED WITH ROTARY WORKING IMPLEMENT

[75] Inventors: Masamichi Hino, Suita; Shigeaki Okuyama, Kawachinagano; Katsumi Ito; Yoshimi Ota, both of Sakai; Mikio Kinoshita, Izumisano, all of Japan

[73] Assignee: Kubota Tekko Kabushiki Kaisha, Osaka, Japan

[21] Appl. No.: 680,479

[22] Filed: Apr. 26, 1976

[30] Foreign Application Priority Data

Apr. 25, 1975 Japan .................................. 50-51092

[51] Int. Cl.² ........................................... A01B 63/112
[52] U.S. Cl. .......................................... 172/3; 172/7
[58] Field of Search .................. 172/2, 3, 4, 4.5, 7, 172/8, 9, 10, 11, 12; 180/77 R, 105 E; 60/706, 709, 906; 404/84; 37/DIG. 1, DIG. 20

[56] References Cited

U.S. PATENT DOCUMENTS

| | | | |
|---|---|---|---|
| 3,313,354 | 4/1967 | Jin | 172/12 |
| 3,674,095 | 7/1972 | Roger | 172/7 |
| 3,732,933 | 5/1973 | Foxwell et al. | 172/7 |
| 3,776,322 | 12/1973 | Misch et al. | 172/2 |
| 3,776,357 | 12/1973 | Arai et al. | 180/77 R X |

FOREIGN PATENT DOCUMENTS

| | | | |
|---|---|---|---|
| 2,418,578 | 11/1974 | Germany | 172/3 |
| 2,260,939 | 6/1974 | Germany | 180/105 E |
| 2,508,620 | 8/1975 | Germany | 172/7 |

*Primary Examiner*—Richard T. Stouffer
*Attorney, Agent, or Firm*—Edwin E. Greigg

[57] ABSTRACT

Load control for engine of vehicle for agricultural work with rotary working implement, for avoiding too much deviation of the working depth while preventing the engine from stopping under heavy overloading. The rotary working implement is automatically raised and lowered in accordance with the results of sensing the engine rotation and of the actual working depth. For prevention of the engine failure, the rotary working implement is unconditionally raised whenever engine rotation below a predetermined value is sensed.

6 Claims, 3 Drawing Figures

TRACTOR TYPE VEHICLE INCLUDING ENGINE AND LOAD CONTROL THEREFOR AND PROVIDED WITH ROTARY WORKING IMPLEMENT

BACKGROUND OF THE INVENTION

1. Field of the Invention

This invention relates to control for engine of the vehicles for agricultural work, especially agricultural tractors, equipped with rotary type working implement, such for cultivation, trench digging and so forth.

2. Description of the Prior Art

When rotary work implement is set to a vehicle for agricultural work, in order to perform cultivation, trench digging or the like, engine load will fluctuate according to the condition of the field, thus to increase when there locally is harder soil, causing the fear, in an extreme case, of the engine failure under too heavy loading. In such case, the engine overload should be released by raising the rotary working implement.

It indeed is conventionally known to provide automatic control for raising and lowering the rotary working implement in response to such field condition. According to such prior art, actual engine rotation of the agricultural work vehicle is sensed, and the so-sensed actual engine rotation is compared with a predetermined value. If the sensed actual rotation is lower than the predetermined desired value, then the rotary working implement is automatically raised; and if higher than desired, then the implement is automatically lowered; thus to maintain the engine rotation always near the set desired value. With such conventional control, the engine is indeed well maintained always near the desired rotation speed, thus without the fear of accidental failure of the engine.

However, such prior art has as its primary object only to maintain the predetermined engine rotation throughout the field operation, and has thus the drawbacks in that the working depth can not be kept constant, as it will heavily fluctuate when there are locations in the field where the soil is locally harder and softer. Fluctuation of the work depth will affect the yields of the crops, especially the effect is serious when the work is cultivation, namely when there is fluctuation in the cultivation depth, resulting in sharp decrease in the yields of the crops.

SUMMARY OF THE INVENTION

The present invention is to provide novel control of engine load, as will eliminate the said drawbacks of the prior art, namely such as will keep the work depth always sufficiently near the desired value, while effectively preventing any accidental engine failure as might be caused by too heavy engine load during the field work.

Load control according to the present invention for engine of vehicle for agricultural work with rotary working implement attached to the body of the vehicle, with: an engine speed setter for giving an output signal corresponding to setting a suitable value of the engine rotation, an engine speed sensor for sensing actual engine rotation and for giving an output signal corresponding thereto, first operation means for comparing the actual engine speed signal output of the speed sensor with the said set value signal output of the speed setter and for giving an output signal indicating which of these two values is larger and by what difference, raising and lowering controlling means for automatically raising and lowering the rotary working implement with respect to the vehicle body in response to the output signal of the first operation means in such manner that the rotary working implement is lowered when the actual engine speed sensed by the speed sensor is higher than the said set value of the engine rotation and that the rotary working implement is raised when the actual speed is lower than the set value; is characterized by the improvement comprising: a working depth setter for giving an output signal corresponding to setting any desired working depth of the rotary working implement; a depth sensor for sensing actual working depth and for giving an output signal corresponding thereto; second operation means provided in between the said first operation means and the said raising and lowering controlling means, for receiving the output signals of the first operation means, of the working depth setter and the depth sensor, and for performing operation of these input signals and giving an output signal to be furnished as an input signal for the said raising and lowering controlling means, in such manner that the actual working depth sensed by the depth sensor as deeper than the said desired working depth will contribute to raising the rotary working implement and that the actual depth sensed as shallower than the desired depth will contribute to lowering the rotary working implement; and forced raising means which receives information from the first operation means and which is actuated only when the actual engine speed sensed by the speed sensor falls below a predetermined value, namely when the speed of the engine is below the predetermined forced-raising-rotation-speed.

As is thus noted, this control employs detection of the actual engine speed, just as in the prior art, in the intention of lowering the rotary working implement when the actual speed is higher than the predetermined suitable value of the engine rotation, but the present invention is characterized by giving an information to the raising and lowering controlling means, when the working depth becomes deeper as the rotary working implement is lowered, as will urge for or contribute to inversely raising the rotary working implement. This will result, therefore, in lessening or compensating the lowering of the rotary working implement, in comparison with the case of the conventional control. Similarly, when the actual engine speed is lower than the predetermined suitable value, then the raising of the rotary working implement is here lessened or compensated. It is thus seen that the present invention will make it relatively easy to keep the working depth sufficiently near the desired value.

Keeping the working depth substantially near the desired value would normally cause fluctuation of the engine speed according to the locational different soil condition, causing the fear of engine failure in an extreme case. However, such accidental engine failure during the field operation is surely avoided with the present invention, by the said provision of the forced raising means as will unconditionally raise the rotary working implement without regard to the actual working depth whenever the engine speed falls below the predetermined forced-raising-rotation-speed.

In other words, stable working depth has now been attained by the provision of the forced raising means somewhat in defiance of the fluctuation of the engine speed, thus making it possible to practically keep the working depth sufficiently near the desired value, while surely avoiding the engine failure.

Primary object of the present invention is thus to provide engine load control as will make it easy to keep the working depth sufficiently near the desired value, while eliminating the accidental engine failure during the field work.

Another object of the present invention is to provide control as will realize efficient operation of the rotary working implement, maintaining the engine speed as near that as possible as is optimal for the engine efficiency.

Still another object of the present invention is to provide control as will make it easy and sure to perform all the subsidiary works incidental to the said work with the rotary working implement, such for instance as turning around the vehicle at the end of the field as well as engaging and disengaging the rotary working implement with the ground.

For a better understanding of this invention and still further objects and advantages, reference will be made to the following description and accompanying drawings and appended claims in which the new and novel features of this invention are set forth.

DESCRIPTION OF THE PREFERRED EMBODIMENT

How the present invention is performed is now described with reference to the drawings which show in non-limitative manner a preferred embodiment of this invention.

Figure 1:
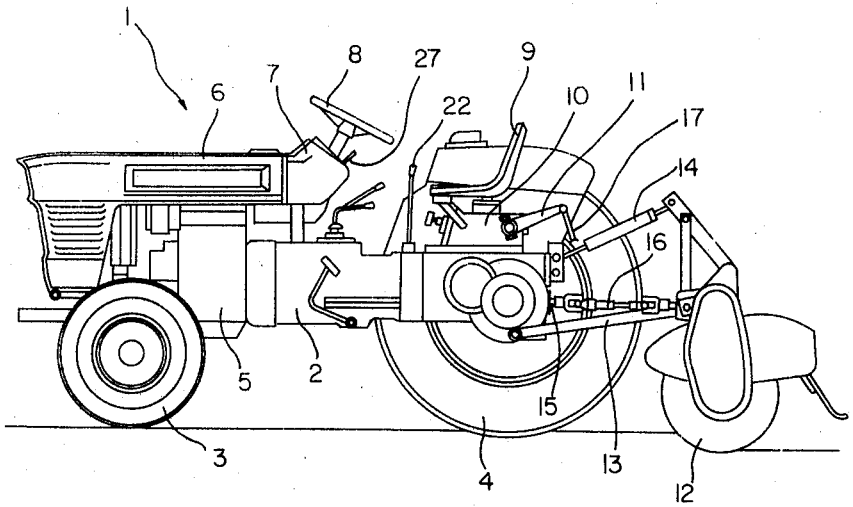
FIG. 1 is a side elevation of an agricultural tractor equipped with rotary cultivation implement with control according to the present invention.

In FIG. 1, tractor 1 shown as an example of the vehicle for agricultural work has its body 2 which supports front wheels 3 and rear wheels 4 in each pair and also an engine 5. This tractor 1 further has a bonnet 6, dashboard 7, steering wheel 8, driver's seat 9, oil hydraulic assembly 10 and so forth. The oil hydraulic assembly 10 is for vertically rocking a pair of lift arms 11 extending rearwards of the body 2. Rotary cultivation implement 12 is shown as an example of the rotary working implement, and is mounted on to the body 2 at a rear portion thereof by means of a three-member link mechanism consisting of a pair of lower links 13 and a top link 14. Power take-off shaft 15 extends from the rear end of the body 2, and via this shaft 15 and a universal joint 16 etc. as may be connected thereto the power of the engine 5 is transmitted to the rotary cultivation implement 12. The lift arms 11 and the lower links 13 are connected together by means of lift rods 17 shown in FIG. 1 with lower portion thereof cut away for clear view of the adjacent parts. Vertical rocking of the lift arms 11 will therefore raise or lower the lower links 13 and further the rotary cultivation implement 12.

Figure 2:
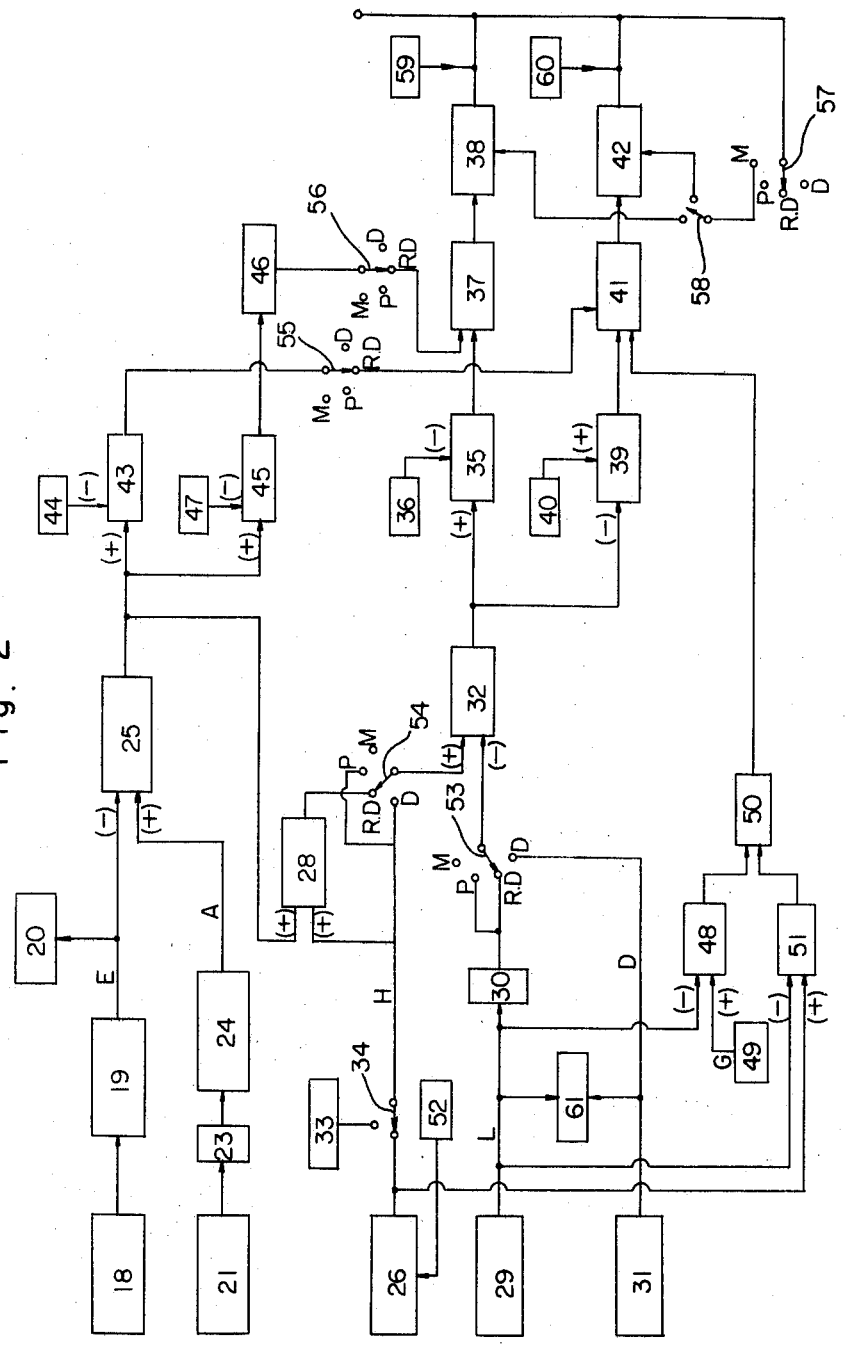
FIG. 2 is a block diagram of the control mechanism.

In the block diagram shown in FIG. 2 of the control mechanism equipped on the tractor 1, an engine speed sensor 18 is supposed here to give a train of pulse signal output as indication of the actual engine speed, such for instance as utilizing an integrating rotation counter cable as is drawn to a vicinity of the dashboard 7 and comprising a toothed disc provided on to such cable and stationary supported set of a light emitting diode and phototransistor, forming a cooperative unit. The pulse signal output of the speed sensor 18 is given to a F—V convertor 19, i.e. a convertor to give a voltage output corresponding to frequency of the pulse signal given as input herefor. An engine speedometer 20 may be provided at any suitable place. An engine speed setter 21 is for giving an output signal corresponding to setting a suitable rotation of the engine 5, and is practically constructed for instance as a variable resistor or potentiometer in interlocking movement with accelerator lever 22. A zero-adjustment compensator 23 is for providing zero-adjustment for the setter 21 in compensation of deviation or displacement as may result from any possible inaccuracy of phase in mounting the setter 21, namely the variable resistor or the like, to the accelerator lever 22. A linearity compensator 24 is for compensating the non-linearity of the relation between the accelerator lever 22 movement and the engine 5 speed, thus to establishing a convenient linear relation between them. A first subtractor 25 is a practical example of the first operation means, and receives output voltage E derived from the speed sensor 18 as the negative input, and speed setter output signal A as the positive input, thus for detecting which one of the actual engine speed as sensed by the speed sensor 18 and the set suitable speed is higher, and by what difference between them. A cultivation depth setter 26 is an example of the setter for setting the working depth and is practically constructed for instance as a variable resistor in interlocking movement with a hand lever 27 provided herefor, giving the output voltage which is of smaller value as the cultivation depth is set deeper. It is to be noted that this cultivation depth setter 26 is to serve as a sensitivity setter when the system is operated under "draft control" mode as defined later. An adder 28 is for adding the engine load variation signal, i.e. output signal (A—E) of the first subtractor 25, and the cultivation depth setting signal, i.e. output signal H of the cultivation depth setter 26, thus to have, under "rotary draft control" mode as defined later for instance the shallower setting of the desired cultivation depth, i.e. setting H smaller, contribute to raising the rotary cultivation implement 12 just as the faster setting of the desired engine speed, i.e. setting E larger. An actual cultivation depth sensor 29 is an example of the actual working depth sensor, and is practically constructed for instance as a variable resistor in interlocking movement with the lift arms 11, giving the output voltage which is of smaller value as the actual cultivation depth is so sensed deeper. Here again, a zero-adjustment compensator 30 is provided for adjusting and compensating the zero point of the cultivation depth sensor 29. An actual draft sensor 31 is for sensing the compression load exerted on the top link 14, giving the output voltage which will take the maximum value when there is no compression load. This output voltage is taken into the control circuitry only during the non-rotary plowing operation, and is switched off the circuitry during the rotary work. A second subtractor 32 is a practical example of the second operation means, and under "position control" mode as is defined later, it receives output voltage H of the cultivation depth setter 26 as the positive input, and output voltage L of the actual cultivation depth sensor 29 as the negative input, thus for giving the output corresponding to the result of the subtraction. Under "rotary draft control" mode already mentioned, it receives output voltage (A−E+H) of the adder 28 as the positive input, and output voltage L just as above as the negative input, thus for giving the output corresponding to the result of the subtraction of these two inputs. This means that the operation in this rotary draft control mode may as well be understood as subtracting the actual cultivation depth sensor 29 output from the desired cultivation depth setter 26 output and summing up the resulting balance and the first subtractor 25 output. Under "draft control" mode already mentioned, it receives the cultivation depth setter output H as the positive input, and output voltage D of the actual draft sensor 31 as the negative input, thus for giving the output corresponding to the subtraction of these two inputs. A circuit member 33 is provided for lifting up the rotary cultivation implement 12, and is to give, when a snap switch 34 is manually changed over for connection hereof at the time of turning around the vehicle at the periphery of the field, the voltage same as the maximum voltage given by the desired cultivation depth setter 26.

A first comparator 35 is to compare the output voltage of the second subtractor 32, when it is of the plus value, with an insensitivity threshold value $\alpha$ set by a first insensitivity threshold setter 36, and depending upon the result of the comparison, is to actuate a raising solenoid valve 38 via a first amplifier 37. When the raising solenoid valve 38 is actuated. The oil hydraulic assembly 10 will raise the rotary cultivation implement 12 via the lift arms 11, lift rods 17 and lower links 13. On the other hand, a second comparator 39 is to compare the output voltage of the second subtractor 32, when it is of the minus value thus in contrast with the case of the first comparator 35, with an insensitivity threshold value as set by a second insensitivity threshold setter 40, whose absolute value may here be supposed also to be $\alpha$, and depending upon the result of the comparison, is to actuate a lowering solenoid valve 42 via a second amplifier 41. When the lowering solenoid valve 42 is actuated, the rotary cultivation implement 12 is lowered just opposite to the case mentioned above. It is thus seen that the information signal given by the second subtractor 32 will actuate the raising and lowering controlling means consisting of the two comparators 35, 39, two amplifiers 37, 41, two solenoid valves 38, 42, as well as the oil hydraulic assembly 10, lift arms 11, lift rods 17 and lower links 13, so as to automatically raise and lower the rotary cultivation implement 12. It is to be noted that the first and second insensitivity threshold setters 36, 40 are provided for prevention of chattering of the solenoid valves 38, 42 and that the set value $\alpha$, as supposed here to be of same absolute value for both of these two as mentioned above, should thus be such as will not cause chattering of these valves 38, 42.

Figure 3:
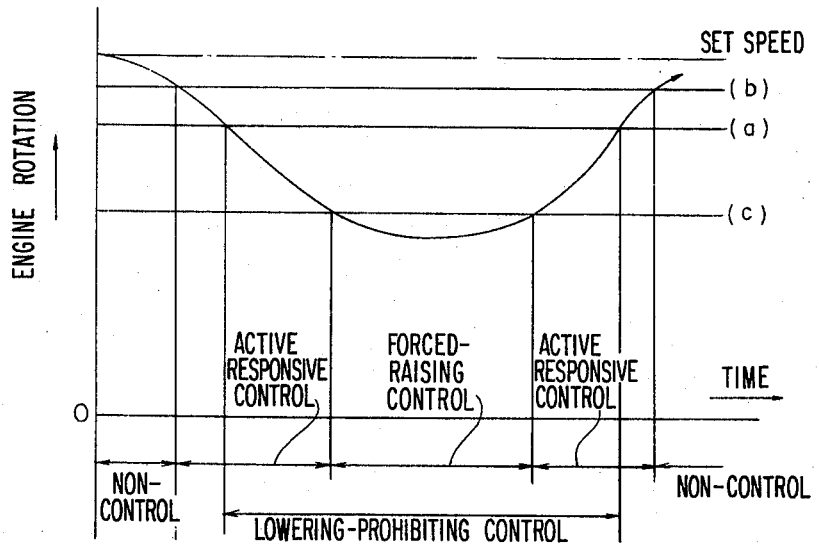
FIG. 3 is a chart showing how the engine speed will vary according to the various control stages.

Lowering prohibiting means 43 is to give a lowering prohibiting output signal for the second amplifier 41 when the actual engine speed is sensed below the lower limit of the self-restoring range of the engine 5, under the rotary draft control mode, thus for prohibiting lowering the rotary cultivation implement 12. Said lower limit of the speed of the engine 5 is set by a lowering prohibiting speed setter 44, and the output voltage corresponding to this lowering prohibiting speed $a$ is compared with the output voltage of the first subtractor 25, for giving the lowering prohibiting signal to the second amplifier 41 only when the actual speed of the engine 5 falls below the lowering prohibiting speed $a$. The circuitry is so designed that a non-control threshold speed $b$ (as shown in FIG. 3) is set, in interlocking with setting the engine speed setter 21, within self-restoring speed range of the engine 5, thus above the lowering prohibiting speed $a$, and that the raising and lowering controlling means is entirely inactive when the engine 5 rotates above this non-control threshold speed $b$. Forced raising means 45 is to energize a first intermittent actuating signal emitter 46 so long as the actual speed of the engine 5 falls below yielding limit rotation speed, so as then to unconditionally raise the rotary cultivation implement 12. Such limit rotation of the engine 5 is set by a forced-raising-rotation-speed setter 47, and output voltage corresponding to the so-set forced-raising-rotation-speed $c$ is compared with the output of the first subtractor 25, and the first intermittent actuating signal emitter 46 is energized only when the rotation speed of the engine 5 falls below the forced-raising-rotation speed $c$. During such energization of the first intermittent actuating signal emitter 46, it gives the intermittent forced-raising actuating signal to the first amplifier 37 and thus intermittently actuates this amplifier 37 for such while.

A third comparator 48 is to compare a ground level signal voltage G as set by and given as output of a ground level setter 49 with the output voltage L of the cultivation depth sensor 29, and is to energize a second intermittent actuating signal emitter 50 so long as the cultivation depth sensor output voltage L is smaller than the ground level signal voltage G. A fourth comparator 51 is to compare the output voltage H of the cultivation depth setter 26 again with the output voltage L of the cultivation depth sensor 29, and is to energize the said second intermittent actuating signal emitter 50 so long as the cultivation depth setter output voltage H is larger than the cultivation depth sensor output voltage L by the difference greater than a predetermined voltage, i.e. so long as the rotary cultivation implement 12 is lower than a level which is a predetermined height above the set cultivation depth. A positive voltage adder 52 is to add on to the cultivation depth setter 26 a positive voltage for providing negative state employing only a single electrical power source. Rotary switches 53, 54, 55, 56, 57 make up a set of gang switch and are thus operated in interlocking movement all together by maneuvering a knob therefor. A manual change-over switch 58 is provided for manually raising and lowering the implement. A limit switch 59 is for detecting uppermost posture of the lift arms 11, while similar switch 60 is for detecting lowermost posture thereof, and these switches 59, 60 are both provided as safety switches. Any suitable cultivation depth indicator 61 may at need be provided.

How this control operates is now described. If manual operation is desired, then the change-over switches 53–57 are set at position M and the manual change-over switch 58 is set at raising or lowering position thereof, as desired, thus for directly energizing the raising solenoid valve 38 or lowering solenoid valve 42, accordingly, and ultimately for raising or lowering the rotary cultivation implement 12 by means of the oil hydraulic assembly 10. When the rotary cultivation implement 12 has reached the desired position upon such raising or lowering, the manual change-over switch 58 is put to its off position. This manual operation is primarily for the case of accident or emergency.

Another mode, referred to in the specification as "position control," is provided by setting the change-over switches 53–57 to position P thereof, and this is for maintaining the rotary cultivation implement 12 in any height thereof as set by the hand lever 27. When the operator sets this hand lever 27 to its desired position, the cultivation depth setter 26 gives, in interlocking movement with the hand lever 27, electrical signal output corresponding to the desired depth. The second subtractor 32 will compare this cultivation depth setting voltage H with the output voltage L given by the actual cultivation depth sensor 29, and according to which of them is larger, the direction of actuating the lift arms 11 is decided. Namely, if the subtraction output voltage (H−L) is positive, it means that the height level set by the hand lever 27 is higher than the actual level of the rotary cultivation implement 12, and in this instance the first comparator 35 compares this subtraction voltage (H−L) with the insensitivity threshold voltage $\alpha$ set by the first insensitivity threshold setter 36, and when the voltage (H−L) is larger than the voltage $\alpha$, then the raising solenoid valve 38 is energized via the first amplifier 37, which will thus supply to the oil hydraulic assembly 10 the hydraulic oil from pressure pump means provided as driving power source and will therefore raise the rotary cultivation implement 12 by means of the lift arms 11. When the lift arms 11 have reached the posture proper to the set level, the output voltage (H−L) of the second subtractor 32 falls to zero and the raising solenoid valve 38 is deenergized, holding the rotary cultivation implement 12 in its position so far raised. On the other hand, if the output voltage (H−L) of the second subtractor 32 is negative, it means that the set level is lower than the actual level, and in this instance the second comparator 39 compares the absolute value (L−H) of this subtraction voltage with the insensitivity threshold voltage $\alpha$ set by the second insensitivity threshold setter 40, and when the absolute voltage (L−H) is larger than the set voltage $\alpha$, then the lowering solenoid valve 42 is energized via the second amplifier 41, which will release the hydraulic oil in the oil hydraulic assembly 10 to freely flow back to reservoir tank under the weight of the rotary cultivation implement 12 which is thus to lower by itself. As is seen, the first and second insensitivity threshold setters 36, 40 will prevent chattering, hunting or overrunning in controlling the raising and lowering of the rotary cultivation implement 12 corresponding to the subtraction output voltage (H−L) of the second subtractor 32. As an example of the sure and proper control, the rotary cultivation implement 12 may thus be prevented from excessive lowering as might be caused by inertia beyond the set desired level, when automatically lowered from a higher level.

During such operation, the third comparator 48 compares the actual cultivation depth signal L from the actual cultivation depth sensor 29 and the ground level setting signal G set by the ground level setter 49. As this ground level is normally set somewhat higher than the lowermost edges of the front and rear wheels 3, 4, the second intermittent actuating signal emitter 50 is energized, during the lowering of the rotary cultivation implement 12 from its floating higher position, slightly before landing of the implement on to the field, and thus emits the intermittent actuating signal of the predetermined frequency and duty ratio, for actuating the second amplifier 41 in on-off manner, i.e. energizing and deenergizing same. Therefore, the rotary cultivation implement 12 will first be rapidly lowered from the higher position until it reaches the said ground level, during which the lowering solenoid valve 42 being kept uninterruptedly energized, but will from that position further on be slowly lowered for soft landing as controlled by the intermittent energization of the lowering solenoid valve 42. Still later on, when the rotary cultivation implement 12 has reached the preset depth, the subtraction output voltage (H−L) of the second subtractor 32 falls to zero and the lowering solenoid valve 42 is deenergized, holding the rotary cultivation implement 12 in the cultivation depth as set by the hand lever 27.

When the tractor body 2 is to be turned around for instance at the end of the field during the cultivation work with the rotary cultivation implement 12 under the position control mode as mentioned above, the snap switch 34 should be changed over for connection with the lifting-up circuit member 33, which is to give the output voltage same as the maximum output voltage as given by the depth setter 26 when the hand lever 27 is brought to the extremity for the uppermost level setting, to serve as input for the second subtractor 32. The raising solenoid valve 38 is thus energized via the first comparator 35 and the first amplifier 37, and the rotary cultivation implement 12 is lifted up, providing convenience for quick and smooth turning around of the tractor body 2.

Still another mode, referred to as "rotary draft control," is provided by setting the change-over switches 53–57 to position R.D thereof, and this is on one hand for controlling the raising and lowering of the rotary cultivation implement 12 in response to fluctuation of the cultivation load and on the other hand for keeping the cultivation depth always sufficiently near a set value, while effectively preventing any accidental failure or stopping of the engine 5. Under such setting of the change-over switches 53–57, the cultivation depth setting signal voltage H as set, for defining initial cultivation work depth at the start of the operation, by the cultivation depth setter 26 in interlocking movement with maneuvering the hand lever 27, is supplied to the second subtractor 32 via the adder 28. All the parts thereafter are to operate just same as in the aforedescribed "position control" mode, and the rotary cultivation implement 12 will land on to the field and will be lowered further down and cultivate at the depth as set as mentioned above. It should however be noted that the actual speed sensor 18 is always sensing the rotation of the engine 5 throughout the cultivation work and giving the pulse signal output corresponding thereto, which is converted by the F−V converter 19 to its output voltage, namely the actual speed signal voltage E, given to the first subtractor 25 as the negative input therefor. Since the output signal voltage A of the engine speed setter 21 as set at the engine start by maneuvering the accelerator lever 22 is given to the first subtractor 25 as the positive input therefor, this will perform the subtraction operation of the said actual speed signal voltage E from this set voltage A, the result corresponding to the engine speed lowering. If this subtraction voltage (A−E) is interpreted as showing that the engine 5 is running above the already mentioned "non-control threshold speed $b$" which is, of course, within the self-restoring engine speed range, then the entire control system after this point is made inactive, thus for continuing the work without active control. Said non-control threshold speed $b$ being set within the self-restoring speed range as mentioned above, speed of the engine 5 will in this instance gradually increase and the preset high speed rotation will in a while be restored.

On the other hand, if speed of the engine 5 is known to be within the range between the said non-control threshold speed $b$ and forced-raising-rotation speed $c$, then active control will operate responsive to the subtraction signal voltage (A−E) of the first subtractor 25, as well as the signal voltages H, L with respect to the cultivation depth. More particularly looking into the operation, the subtraction signal voltage (A−E) is summed up by the adder 28 with the cultivation depth setting signal voltage H, and the summation signal voltage (A−E+H) is given to the second subtractor 32 for subtracting the actual cultivation depth signal voltage L therefrom. The resulting subtraction signal voltage is to control energization of the solenoid valves 38 and 42, thus raising and lowering the rotary cultivation implement 12, in a manner just same as described above with respect to the position control mode. If, for example, actual speed of the engine 5 increases under fluctuation of load, then the lowering solenoid valve 42 is energized for lowering the rotary cultivation implement 12. In this instance, however, the lowering of the rotary cultivation implement 12 is immediately to reduce the output signal voltage L of the actual cultivation depth sensor 29, which is supplied to the second subtractor 32 as its negative input. This is of course the information contributing to raising the rotary cultivation implement 12 in opposition to or in compensation of the said initial or original lowering. This means that the said lowering of the rotary cultivation implement 12 is with the present control properly compensated or reduced, as mentioned at the top of the present description. In case of opposite initial fluctuation, it is clear, of course, that the raising of the rotary cultivation implement 12 is similarly reduced. It is thus seen that the cultivation depth is hereby always properly maintained near the desired value.

In this instance, if the engine speed falls under fluctuation of load down beyond the lowering prohibiting speed $a$, the subtraction output voltage (A−E) of the first subtractor 25 will in this case actuate the lowering prohibiting means 43 and the lowering solenoid valve 42 is not to be energized even if the engine speed is somewhat increased by the raising of the rotary cultivation implement 12, so long as the speed remain down the said value $a$, thus on one hand never resulting in the undesirable control for maintaining too low engine speed and on the other hand preventing the hunting of the engine speed control.

It should be noted that the turning around of the vehicle body 2 can be easily done, also under this rotary draft control mode, by changing over the snap switch 34; and that the control setting is to return to the previous state without any change, immediately when the snap switch 34 is switched back to the previous position. Soft landing effect for the rotary cultivation implement 12 provided by the third comparator 48 and second intermittent actuating signal emitter 50 works also under this rotary draft control mode in the manner just same as described with respect to the position control mode.

Still further, if the engine speed drastically falls under quite heavy fluctuation down even beyond the forced-raising-rotation speed $c$ set by the forced-raising-rotation-speed setter 47, the subtraction output voltage (A−E) of the first subtractor 25 will in this instance energize the first intermittent actuating signal emitter 46 via the forced-raising means 45. Therefore, the raising solenoid valve 38 is now intermittently energized by the intermittent actuating signal of the first intermittent actuating signal emitter 46, and the rotary cultivation implement 12 is in turn intermittently raised thus for the benefit of restoring the higher engine speed. In short, the rotary cultivation implement 12 is unconditionally raised in this case for restoring the safe engine speed. Failure of the engine 5 during the work is thus surely prevented by the provision of this forced-raising means 45.

Engine speed ranges for the various stages of the control, i.e. non-control, active responsive control, lowering-prohibiting control and forced-raising control, are shown in FIG. 3.

Yet another mode, referred to as "draft control," is provided by setting the change-over switches 53-57 to position D thereof, and in this mode the cultivation depth setter 26, which was so far used indeed for setting the cultivation depth, is utilized for setting the sensitivity. This "draft control" mode is for the work with the implement such as plow or the like. When such working implement is lifted up, the top link 14 bears no compression load, namely there is no load to be sensed by the actual draft sensor 31, thus with the output voltage thereof at its maximum value. In such condition, when the hand lever 27 is put in its suitable position for setting the desired value of draft by the cultivation depth setter 26 in this instance, subtraction output voltage (H−D) of the second subtractor 32 will energize the lowering solenoid valve 42 via the second comparator 39 and the second amplifier 41; and the working implement will thus be lowered for starting the work, i.e. plowing or the like. In such work, if the compression load of the top link 14 increases under heavier plowing resistance in the possible fluctuation of the draft, thus with the sensed draft signal voltage D of the draft sensor 31 lowered accordingly, then the second subtractor 32 will give the output voltage (H−D) in a positive value, and if it is larger than the insensitivity threshold value $\alpha$ set by the first insensitivity threshold setter 36, then the raising solenoid valve 38 is energized via the first comparator 35 and the first amplifier 37, and the working implement is raised. As the implement is raised, the load is alleviated and the raising solenoid valve 38 will thus be deenergized. On the other hand, if the draft lowers under fluctuation of the soil condition in the field, then the working implement is lowered until the draft increases up to the set value.

It should be noted that the turning around of the vehicle body 2 can be easily done, also under this draft control mode, by the action of the lifting-up circuit member 33; and that the signal given by the second intermittent actuating signal emitter 50 similarly works for the soft landing of the working implement.

In the block diagram of FIG. 2, positive and negative inputs are shown by + and − signs, respectively. However, the entire circuitry works just same even if the electrical polarity is completely reversed, thus interchanging the said + and − signs with each other. Furthermore, it has been described with respect to the function of the fourth comparator 51 that the emitter 50 is energized when the rotary cultivation implement 12 is lower than a level which is a predetermined height above the set cultivation depth. In this connection it should be noted that the ground level setter 49 may be dispensed with by setting the said predetermined height somewhat large, say for instance as 10 cm.

What we claim is:

1. A tractor type vehicle including an engine and a load control therefor, said vehicle being provided with a rotary working implement pivotally attached to a body of the vehicle, said engine including a speed setter for giving an output signal (A) corresponding to setting a suitable value of rotation of the engine, an engine speed sensor for sensing actual rotation of the engine and for giving an output signal (E) corresponding thereto, first operational means for comparing the actual engine speed signal output (E) of the speed sensor with the said set value signal output (A) of the speed setter and for giving an output signal (A−E) indicating which of these two values is larger and by what difference, control means for automatically raising and lowering the rotary working implement with respect to the vehicle body in response to the output signal (A−E) of said first operational means so that the rotary working implement is lowered when the actual engine speed sensed by the speed sensor is higher than the said set value of the engine rotation and that the rotary working implement is raised when the actual speed is lower than the set value, the improvement comprising:

- a working depth setter for giving an output signal (H) corresponding to setting any desired working depth of said rotary working implement,
- a depth sensor for sensing actual working depth and for giving an output signal (L) corresponding thereto,
- second operational means provided in between the said first operational means and the said control means, for receiving the output signals (A−E, H, L) of the first operational means, of the working depth setter and the depth sensor, and for performing operation of these input signals and giving an output signal (A−E+H−L) to be furnished as an input signal for the said control means, in such manner that the actual working depth sensed by the depth sensor as deeper than the said desired working depth will contribute to raising the rotary working implement and that the actual depth sensed as shallower than the desired depth will contribute to lowering the rotary working implement,
- further means for prohibiting lowering the said rotary working implement, to be actuated only when the sensed speed signal output (E) of the speed sensor falls beneath a value set in a predetermined interlocking relation with the set engine speed, and
- forced raising means for raising said rotary working implement, said forced raising means receiving information (A−E) from the first operational means and being actuated only when the actual engine speed sensed by the speed sensor falls below a predetermined value, namely when the speed of the engine is below the predetermined forced-raising-rotation-speed (c).

2. The control of claim 1, wherein the said control means is actuated only when the sensed speed signal output (E) of the speed sensor falls beneath a value set in a predetermined interlocking relation with the set engine speed, namely when the rotation speed of the engine is below a non-control threshold speed (b) which is suitably predetermined above the said lowering-prohibiting speed (a).

3. The control of claim 2, wherein the said forced raising means intermittently raises the rotary working implement.

4. The control of claim 3, wherein the said control means comprises:
- a first comparator provided for raising the rotary working implement only when the output signal (A−E+H−L) of the second operational means is positive with absolute value thereof greater than a predetermined first insensitivity threshold $\alpha$, and
- a second comparator provided for lowering the rotary working implement only when the output signal (A−E+H−L) of the second operational means is negative with absolute value thereof greater than a predetermined second insensitivity threshold $\alpha$.

5. The control of claim 4, further comprising:
- a lifting-up circuit member for giving a signal to the second operational means for thereby raising the rotary working implement at least above ground surface level, and
- means for alternatively connecting one of the lifting-up circuit member and the working depth setter to the second operational means.

6. The control of claim 5, further comprising a third comparator which compares the sensed output signal (L) of the depth sensor with a predetermined ground level signal (G) and which gives a controlling signal for the control means for reducing the lowering speed of the rotary working implement upon detection that the actual level of the rotary working implement is below a predetermined height above the ground level.

* * * * *